United States Patent Office
3,471,094
Patented Oct. 7, 1969

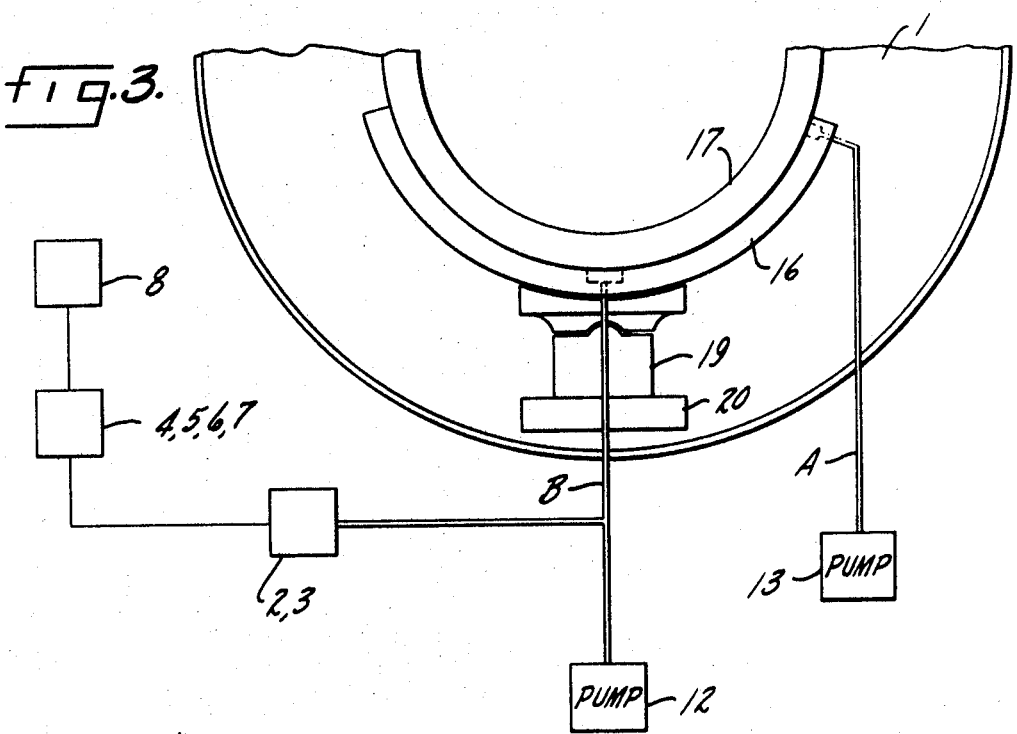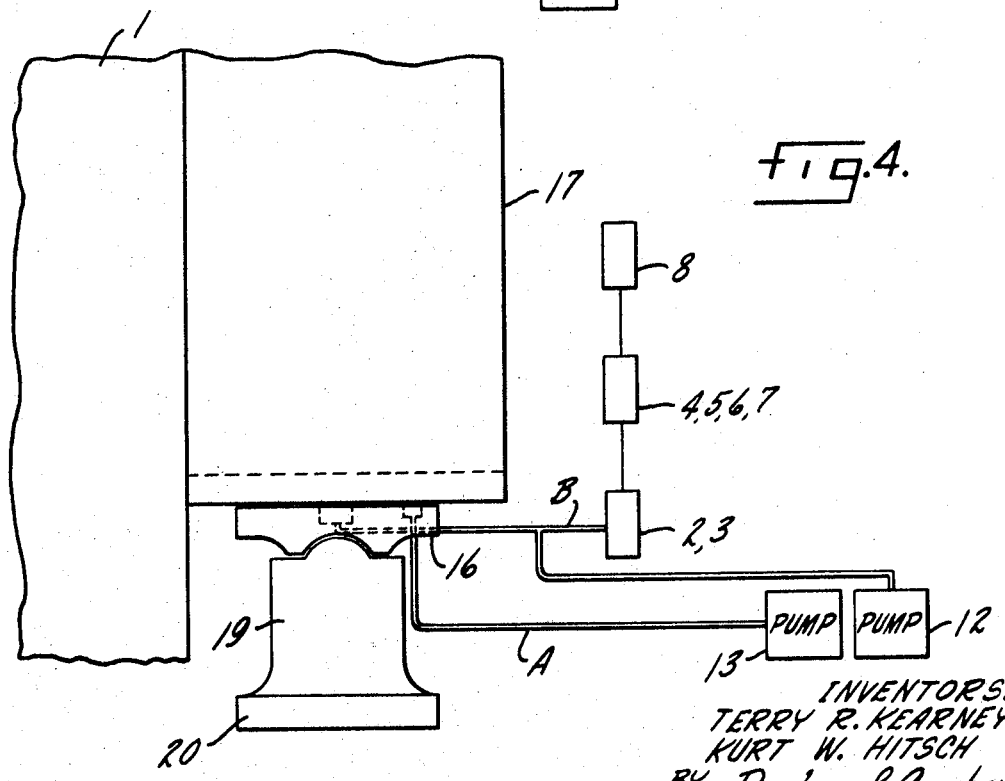

3,471,094
HYDRAULIC CONTROL SYSTEM FOR MILLS
Terry R. Kearney, 8922 W. Howard Ave., Milwaukee, Wis. 53220, and Kurt W. Hitsch, 3284 S. Delaware, Englewood, Colo. 80110
Filed Dec. 1, 1966, Ser. No. 598,147
Int. Cl. B02c 4/32, 7/14, 9/04
U.S. Cl. 241—30                                                  10 Claims

ABSTRACT OF THE DISCLOSURE

Method and apparatus for automatically controlling the weight or level of charge in a grinding mill in which a bearing shoe supports a journal wherein a lubricant is delivered to the space between the shoe and journal at a back pressure exceeding the normal gravital pressure therebetween and the feed rate is controlled in response to variations in the excess back pressure.

SUMMARY OF THE INVENTION

It is common knowledge that for each type and size of grinding mill which uses a charge to do the grinding or to be ground there exists a level or weight of charge which produces the most efficient grinding. Therefore, it is desirable to have a method of controlling the weight or level of the charge within narrow limits.

Several devices for the automatic control of the level or weight of charge in grinding mills are known to be available. One such device makes use of the power drawn by the drive motor as a measure of the weight or level of charge and makes corrective increases or decreases of the material being fed accordingly. This system does not give accurate control of the charge weight or level and as a result is rarely used nowadays.

Another such device makes use of load cells, placed under the bearing shoes, which produce a signal proportional to the weight of the grinding mill and charge. This signal is then fed to a control system which controls the amount of material fed to the grinding mill in such a way as to control the weight of charge. This method is very complex, the components are expensive and delicate, and the control obtained varies over wide limits as a result of lag times in the control elements and zero shifts in the load cells. Some of the components must be installed in locations where they are subjected to dust, moisture, corrosion and rough handling and as a result of this and the complexity, maintenance is costly and must be done by specialists.

A third such device makes use of sound detection, at a fixed frequency, by microphones placed near the shell of the grinding unit to evaluate the charge level. The signal produced is fed to a controller which controls the material fed to the grinding unit in such a way as to maintain a constant sound level. This unit is complex and expensive. Since it depends on an indirect measurement, its accuracy is affected by changes in the grinding media and by buildup of the material being ground, on the shell of the grinding mill. Some of the components of this device must be installed in close proximity to the grinding unit where they are subjected to dust, moisture, corrosion and rough service. Still another system utilizes a combination of sound and power and has many of the disadvantages of both.

We have found that the disadvantages of the above devices can be overcome when the back pressure of a hydraulic film between the mill bearing journal and the bearing shoe is used as a measure of the weight of the grinding mill and charge. The pressure so used can be generated in several ways. The simplest method of generation of pressure is by means of the hydraulic wedge action of the bearing shoe and the mill bearing journal acting on the hydraulic fluid supplied for low pressure lubrication. A second method is by generating pressure by means of a high pressure pump supplying hydraulic fluid to the high lift recess in the bearing shoe. A third method of generating the required pressure requires the installation of a separate recess in the bearing shoe and the operation of a separate high pressure pump to supply hydraulic fluid to the recess for the purpose of pressure measurement only. These methods will serve as examples.

The hydraulic back pressure generated in any one of the above ways has been found to be proportional to the weight of the grinding mill plus the weight of charge. Since the weight of the grinding mill changes very slowly as the liners wear, short term changes in back pressure are proportional to the change in weight of the charge in the grinding mill.

The change in hydraulic back pressure can be controlled by means of any system which controls the rate of feeding fresh material into a grinding mill. It has been found that several adaptations of commercial pressure control systems, control the change in back pressure to a narrow range of pressure and as a result control the level and weight of charge in a grinding mill, by controlling the material fed to the grinding mill.

The use of changes in back pressure of the hydraulic film, between the mill bearing journal and the bearing shoe, as a measure of the weight or level of charge permits the use of very inexpensive, simple and rugged automatic control elements. The elements required may be stock items and can be serviced by relatively inexperienced tradesmen. Service problems are significantly reduced because all the control elements may be installed remotely from the grinding mill.

The control of level or weight of charge using this method has been found to be very stable as compared to that obtained with other methods. The response of the controller is more rapid than with other systems and the response of the controller is proportional to deviation from the set point. As a result, the magnitude of cycling of the charge level or weight is lower than with other systems.

This method is applicable, for example, to single or double compartment grinding mills. Application of this method to grinding mills under construction or already installed is simple and relatively inexpensive. The method is applicable to trunnion mounting grinding mills having either single or segmented bearing shoes in each trunnion bearing.

Other purposes will appear from time to time in the course of the specification and claims.

We illustrate the invention more or less diagrammatically in the accompanying drawings wherein:

FIGURE 3 is a schematic side view of the arrangement of components of a control system based on hydraulic back pressure control, as applied to one trunnion bearing;

FIGURE 4 is a schematic end view of the arrangement of components of a control system based on hydraulic back pressure control, as applied at one trunnion bearing;

Like parts are indicated by like symbols throughout the specification and drawings.

Figure 1:
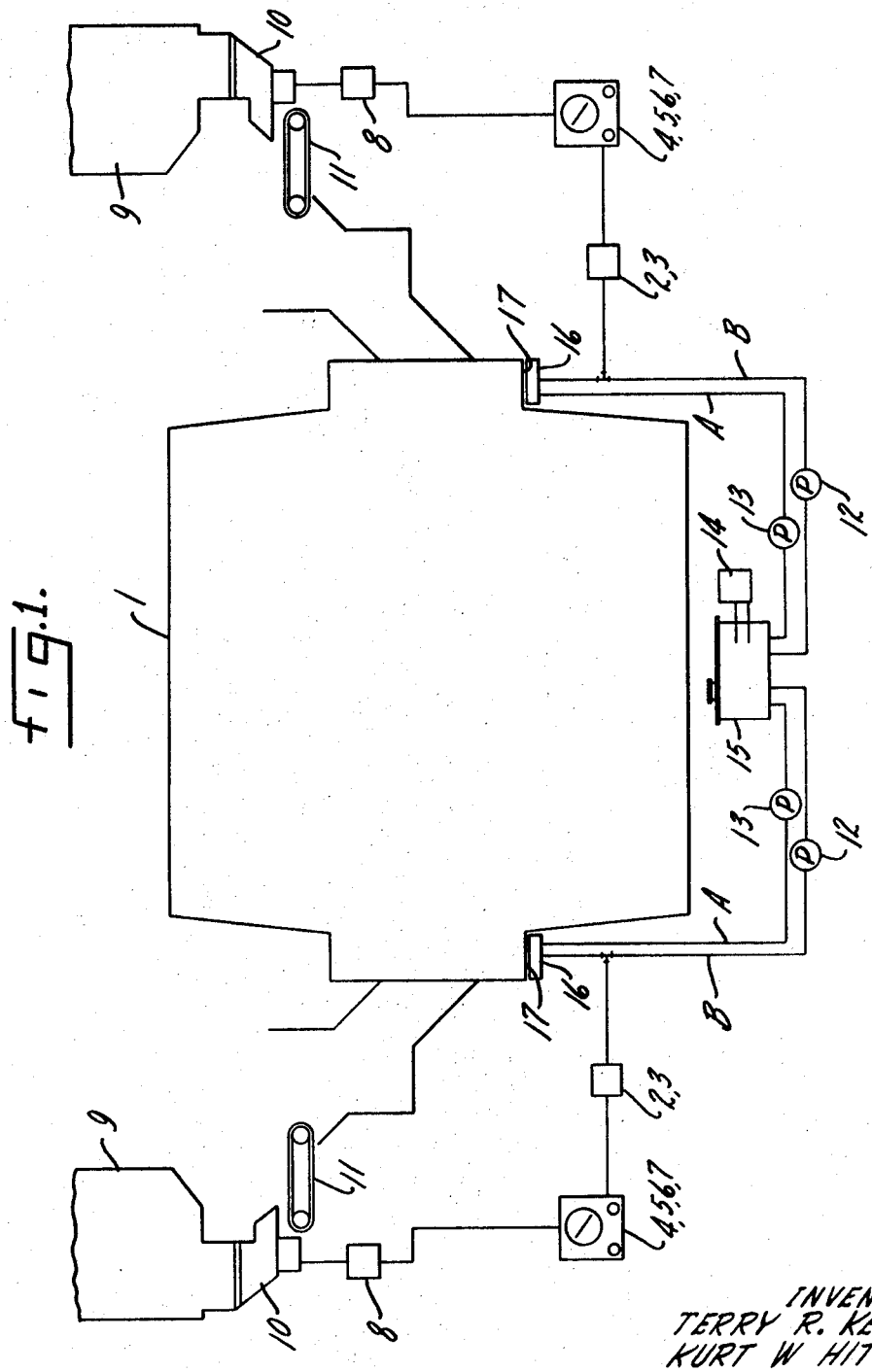
FIGURE 1 is a schematic side view layout of a control system based on hydraulic back pressure control as applied to a double compartment grinding mill.

It will be realized that in diagrammatic FIGURES 3 and 4 some components are, for convenience and simplicity, combined in single blocks. And, in FIGURE 1, it will be realized that the opposite ends of the mill are handled by identical control systems.

Hydraulic fluid for the lubrication of the bearing is provided by a pumping device 13 from a hydraulic fluid reservoir 15. A thermostatically controlled unit 14 is provided to maintain the hydraulic fluid in the hydraulic fluid reservoir 15 within temperature limits to prevent excessive changes in viscosity of the hydraulic fluid. A second pumping device 12 is provided for the purpose of supplying high pressure hydraulic fluid to the bearing before start-up and thus produces a lubricating film between the mill bearing journal 17 and the bearing shoe 16.

The mill bearing journal 17 is firmly attached to the grinding mill 1. The mill bearing journal 17 is supported by the bearing shoe 16. The bearing shoe 16 rests on the bearing shoe support 19 (FIGURES 3, 4) which is supported by the foundation sole plate 20.

When the grinding mill 1 is in operation the back pressure of the hydraulic film between the mill bearing journal 17 and the bearing shoe 16 is transmited by a suitable pipe or tube, connected with the hydraulic lift line A or with a second high pressure line B installed for the purpose, to a remotely located pressure sensing device 2 connected to a transmitter-converter 3. The pressure sensing device 2 can be installed at a distance of up to several hundred feet from the bearing shoe 16.

Figure 2:
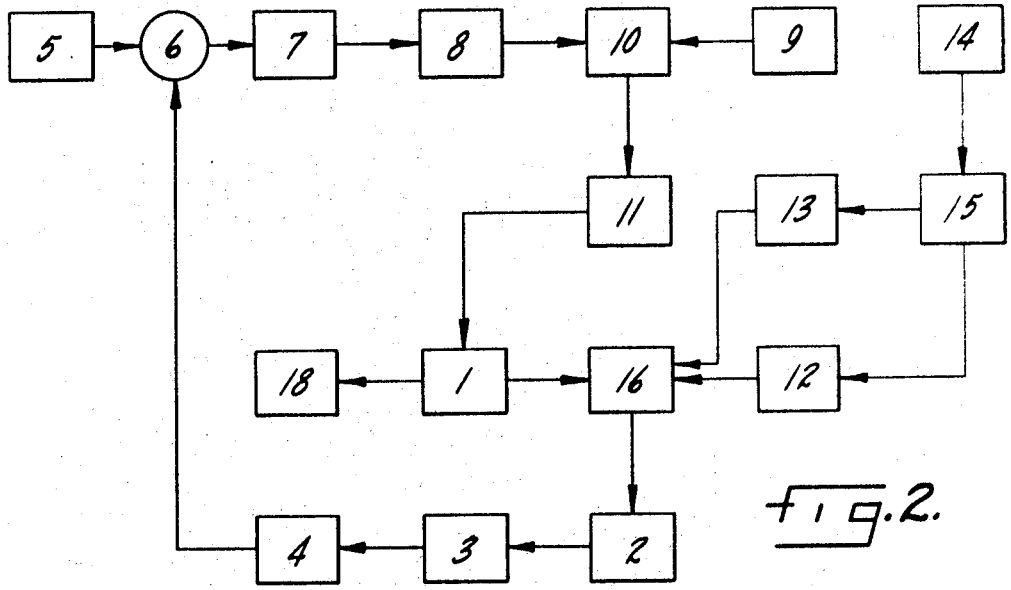
FIGURE 2 is a block diagram, incorporating directional arrows, of a control system based on hydraulic back pressure control, as applied to one trunnion bearing.

The signal from the transmitter-converter 3 is carried to a recorder 4, having associated with it a control index 5, deviation comparator 6, and controller 7, as shown in FIGURE 2. Items 4, 5, 6 and 7 may be components of commercial industrial recorder-controllers, and need not be detailed. The output or controlled signal is carried to a control relay 8. The control relay 8 converts the controlled signal to a form acceptable to a controlled rate bulk feeder 10. The controlled rate bulk feeder 10 responds to the signal provided and feeds material from the bulk storage bin 9 onto a bulk conveyor 11 and thence into the grinding mill 1, at a rate which maintains the level or weight in the grinding mill within narrow desired limits.

Figure 5:
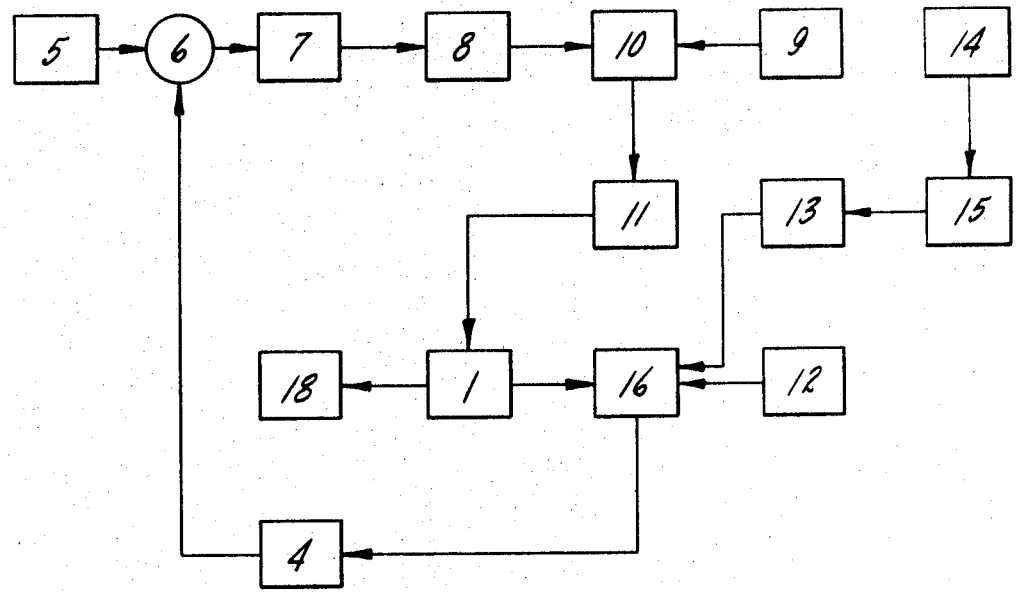
FIGURE 5 is a block diagram of a simplified control system based on hydraulic back pressure control as applied at one trunnion bearing.

As shown in FIGURE 5, the above method of application may be further simplified by carrying the back pressure from the bearing shoe 16 to a recorder-controller 4, 5, 6, 7 with a directly coupled pressure sensing element 2. This eliminates the use of a converter transmitter 3. The controlled signal is then carried to the control relay 8, and the functions of the control relay 8, controlled rate bulk feeder 10, and bulk conveyor 11 remain as above described.

The simplified method of application reduces the costs of installation and maintenance slightly but limits the adjustment possible and the sensitivity and accuracy. All control elements used in the simplified method of application can be installed remotely from the grinding mill.

Figure 6:
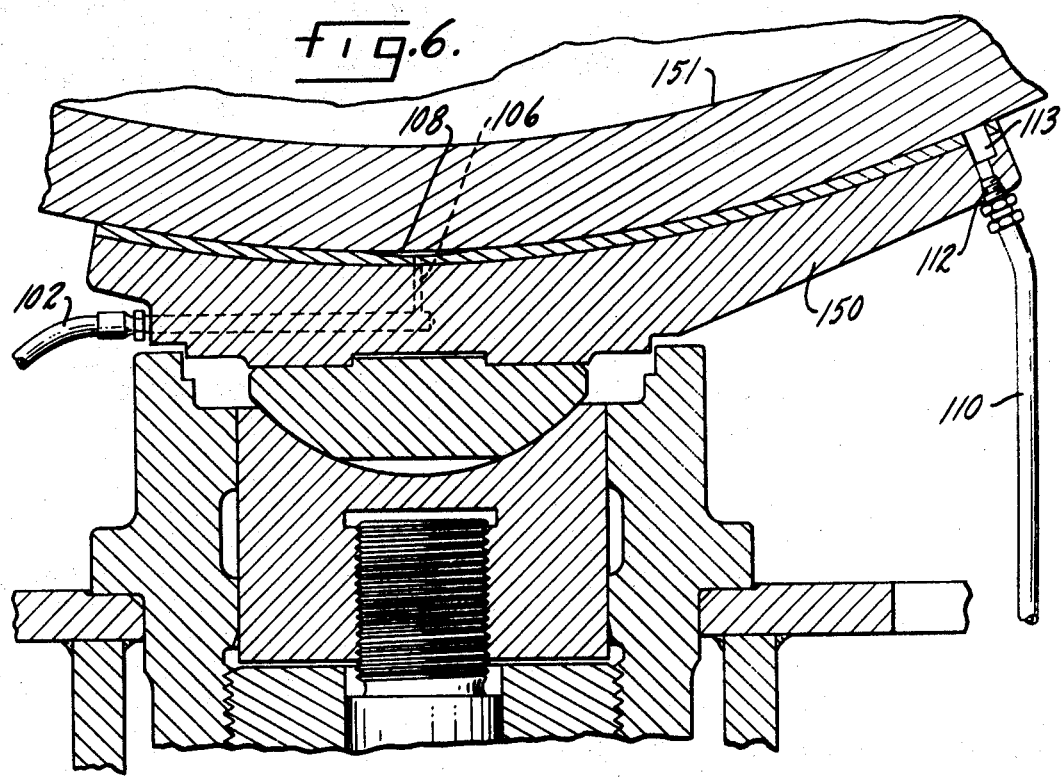
FIGURE 6 is a view, in greater detail, of a type of bearing support for mills to which our invention may be applied.

Referring to FIGURE 6, 150 indicates a bearing shoe with which our method may be applied, and which is shown in supporting relationship to a trunnion, part of which is indicated at 151.

Figure 7:
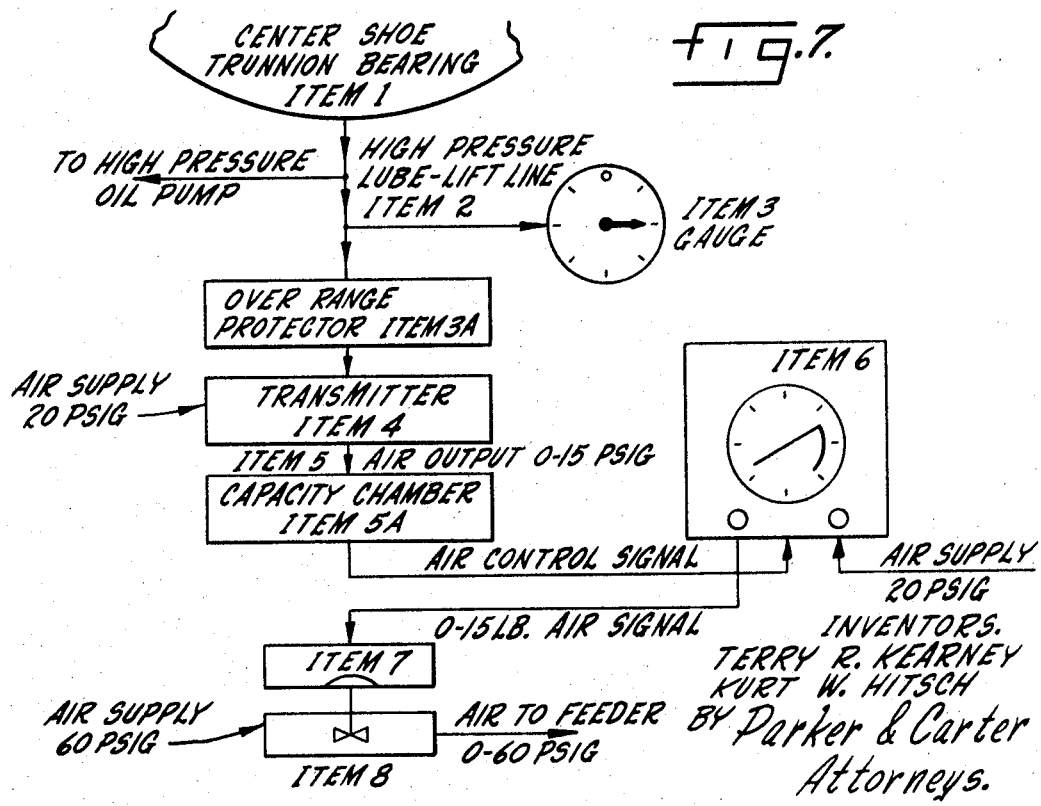
FIGURE 7 is a schematic diagram of a specific application to a trunnion bearing of the general type shown in FIG. 6.

A specific application of our system is diagrammatically or schematically illustrated in FIGURE 7, which is broken down into items. For convenience, we describe the items as follows:

Item 1 is the center shoe bearing on either end of the mill (the control systems are identical for each end of the mill). They are identical for the application as shown here but are not necessarily identical for all cases.

Item 2 is a ¼-inch pipeline, with a non-return flow valve, connected to the high-pressure oil, or fluid, line at the bottom of the center shoe; it runs from the high-pressure hole in the shoe to a T in the line—one line going to the pressure side of the high-pressure oil, or fluid, pump and the other line going to the panel board and gauge.

Item 3 is the high-pressure oil, or fluid, line gauge which is the basic feed control signal except when the high-pressure "lift" pump is in operation prior to and during the mill startup. The middle shoe on the A side normally fluctuates from 650 p.s.i.g. to 690 p.s.i.g., and the B side, 570 p.s.i.g. to 605 p.s.i.g.

Item 3A is a large over-range protector manufactured by Honeywell and set up at 1250 p.s.i.g. The unit in service is a Sprague Model S–2144–300 which was purchased through Honeywell. The output signal, 0 to 15 p.s.i.g. air, goes from the mill control room main panel board to the main air supply line to the ore feeders.

Item 4 is a Honeywell 708N11–P3–1¼–111–19–61 non-indicating pneumatic pressure transmitter, 0 to 1500 p.s.i. range.

Item 5 is a connecting ¼-inch pipeline transmitting a 0 to 15 p.s.i.g. air signal.

Item 5A are Honeywell capacity chambers which provide the equivalent of 200 feet of ¼-inch tubing of air capacity. This tends to minimize the fluctuation that occurs in the oil, or fluid, pressure each revolution of the mill. The control air signal is transmitted to the controller, Item 6.

Item 6 is a Honeywell "Air-O-Line," Model E–15, with a standard 0 to 150 percent proportional band and standard reset features.

Items 7 and 8 consist of the upper half of a standard air-operated pneumatic control valve, 3 to 15 p.s.i.g., and a standard Honeywell reducing valve with the screw-type stem modified for vertical stroke operation. The vertical stroke reducing valve regulates the output air pressure between 0 and 60 p.s.i. which control the feed rate on the pneumatic ore feeders.

It will be realized, of course, that the above merely indicates a possible use of equipment, primarily of commercially available equipment, and is not to be treated as a limitation of our invention.

It is necessary in a structure of the type shown to provide lubrication to the surfaces of the bearing shoe 150 which support the trunnion 151. It may be advantageous to provide a high pressure oil, or fluid, for use before the mill is started, and a lower pressure oil, or fluid, for use when the mill is rotating. A high presure oil, or fluid, line indicated at 102 and is connected to a passage in the shoe 150 which leads into an upwardly extending passage 106 which feeds oil, or fluid, into a somewhat concave recess 108. Low pressure oil, or fluid, is supplied through a line 110 and the connection 112 to a groove 113 which may run almost the full width of the upper surface of the bearing shoe 150. The details of support and adjustment do not of themselves form part of the present invention, but the structure is illustrated merely to indicate a type of mill support with which our invention may be practiced.

Whereas we have described and illustrated a practical application of our invention and the structure with which our method may be employed, it will be understood that many changes may be made in size, shape, number and disposition of parts, and in method steps, without departing from the spirit of our invention. We wish our description and drawings to be taken as, in a broad sense, illustrative or diagrammatic rather than as limiting us specifically to any particular disclosure. It will be understood, of course, that the details of the feeding means whereby material is fed to the mill do not of themselves form part of the present invention.

We claim:

1. A method of controlling the level or weight of charge in a grinding mill in which a bearing shoe supports a journal, which includes delivering to the space between the journal and bearing shoe a lubricant under conditions to maintain a hydraulic film between bearing and journal at a back pressure exceeding that normally caused by the gravital pressure of the journal against the bearing shoe, sensing this excess back pressure, and employing it to control the charge level in the grinding mill while feeding the new material to grind or to be ground at a rate responsive to changes in such back pressure, and thereby maintaining substantially constant the weight or level of the charge in the grinding mill.

2. A method as defined in claim 1, in which a pressure control system is adapted to automatically control the rate at which new charge material is fed to a grinding mill.

3. A method as defined in claim 1 in which a pressure control system is adapted to automatically control the rate at which new material to be ground is fed to a grinding mill.

4. A method as defined in claim 1 in which the hydraulic pressure measured is generated by the hydraulic wedge action of the mill bearing journal and a bearing shoe.

5. A method as defined in claim 1 in which the hydraulic pressure measured is generated by the action of a pumping device connected to the high pressure lift recess of a bearing shoe.

6. A method as defined in claim 1 in which the hydraulic pressure measured in generated by a pumping device connected to a recess in a bearing shoe specially designed for this purpose.

7. A method as defined in claim 1 in which provision is made for the inclusion of a temperature control system in the hydraulic supply line.

8. In a grinding mill and control means therefor, a horizontally axised mill body, trunnion bearing means at each end of the mill body, bearing shoes therefor, means for delivering material to be ground into at least one end of the mill body, a controllable feeder means in the line of flow of material to said end of the mill body, and means for controlling such feeder means in response to variations in back pressure of a hydraulic film between a mill bearing and the bearing means to be controlled, including supplemental means for maintaining an excess pressure between trunnion bearings and bearing shoes.

9. The structure of claim 8 characterized by and including a common hydraulic source for the mill bearings at both ends of the mill.

10. The structure of claim 8 characterized by and including individual pressure sources for the lubrication of the bearings at opposite ends of the mill.

References Cited

UNITED STATES PATENTS

| | | | |
|---|---|---|---|
| 1,808,914 | 6/1931 | Bennett | 241—36 |
| 2,456,074 | 12/1948 | Newhouse | 241—36 X |
| 2,766,941 | 10/1956 | Weston | 241—34 X |
| 3,253,744 | 5/1966 | MacPherson | 241—34 X |
| 3,350,018 | 10/1967 | Harris | 241—34 |

ROBERT C. RIORDON, Primary Examiner

D. G. KELLY, Assistant Examiner

U.S. Cl. X.R.

241—34